United States Patent [19]

Tanaka et al.

[11] Patent Number: 5,523,267

[45] Date of Patent: Jun. 4, 1996

[54] SILICON NITRIDE-SILICON CARBIDE COMPOSITE SINTERED MATERIAL AND MANUFACTURING THEREOF

[75] Inventors: Kouichi Tanaka; Masaki Terazono; Masahiro Satoh; Masahito Nakanishi; Hideki Uchimura; Shoji Kousaka, all of Kokubu, Japan

[73] Assignee: Kyocera Corporation, Kyoto, Japan

[21] Appl. No.: 276,596

[22] Filed: Jul. 18, 1994

Related U.S. Application Data

[63] Continuation of Ser. No. 815,117, Dec. 27, 1991, abandoned.

[30] Foreign Application Priority Data

| Dec. 27, 1990 | [JP] | Japan | 2-416049 |
| Dec. 28, 1990 | [JP] | Japan | 2-416116 |
| Nov. 29, 1991 | [JP] | Japan | 3-315070 |

[51] Int. Cl.$^6$ .................................................. C04B 35/567
[52] U.S. Cl. ........................... 501/92; 501/96; 501/97; 501/98; 501/127; 501/128; 428/698
[58] Field of Search .................. 501/96, 97, 98, 501/127, 128, 92; 428/688, 689, 697, 702, 704, 325, 331

[56] References Cited

U.S. PATENT DOCUMENTS

| 3,833,389 | 9/1974 | Komeya | 501/98 |
| 3,890,250 | 6/1975 | Richerson | 501/97 |
| 4,156,051 | 5/1979 | Nakamura | 428/446 |
| 4,594,330 | 6/1986 | Suzuki | 501/97 |
| 4,643,858 | 2/1987 | Mizutani | 428/697 |
| 4,690,790 | 9/1987 | Bates | 501/92 |
| 4,800,182 | 1/1989 | Izaki | 501/92 |
| 4,853,299 | 8/1989 | Mizutani | 428/698 |
| 4,920,085 | 4/1990 | Yoshida | 501/97 |
| 4,956,317 | 9/1990 | Yokoi | 501/97 |
| 5,045,269 | 9/1991 | Sara | 501/96 |

FOREIGN PATENT DOCUMENTS

| 282879 | 9/1988 | European Pat. Off. . |
| 389962A3 | 3/1990 | European Pat. Off. . |
| 397464 | 11/1990 | European Pat. Off. . |
| 2651311 | 5/1977 | Germany . |
| 3428731A1 | 2/1986 | Germany . |
| 3840573A1 | 6/1989 | Germany . |
| 60-046973 | 3/1985 | Japan . |
| 2302369 | 12/1990 | Japan . |

*Primary Examiner*—Ellis P. Robinson
*Assistant Examiner*—Timothy M. Speer
*Attorney, Agent, or Firm*—Loeb & Loeb

[57] ABSTRACT

A silicon nitride-silicon carbide composite sintered material which comprises 100 parts by weight of a silicon nitride component containing 92 to 99.5 mol % of silicon nitride including excessive oxygen and 0.5 to 8 mol % of the elements of Group IIIa in the Periodic Table as corresponding oxides thereof and 1 to 100 parts by weight of a silicon carbide component in a dispersed state, wherein the silicon nitride component has an average particle size of 1 μm or less and an average aspect ratio of 2 to 10, and the silicon carbide component has an average particle size of 1 μm or less, moreover, the total amount of Al, Mg, Ca respectively contained in the sintered material as calculated as oxides thereof is 0.5% by weight or less, and a manufacturing method thereof.

According to the above-mentioned composite sintered material, it becomes possible to suppress deterioration of strength at 1400° C. and realize excellent creep properties. Therefore, the composite sintered material is applicable not only to structural materials for heat engines such as gas turbines and turbo-rotors but also to other heat resistant materials for various uses.

10 Claims, No Drawings

SILICON NITRIDE-SILICON CARBIDE COMPOSITE SINTERED MATERIAL AND MANUFACTURING THEREOF

This is a continuation of application Ser. No. 07/815,117 filed on Dec. 27, 1991, now abandoned.

BACKGROUND OF THE INVENTION

(1) Field of the Invention

The present invention relates to a silicon nitride-silicon carbide composite sintered material mainly containing silicon nitride and silicon carbide and also relates to a manufacturing method of the material. Particularly, this invention relates to a sintered material which is applicable to high-temperature structural materials and excellent in room-temperature strength, high-temperature strength and high-temperature creep properties, and also relates to a manufacturing method of the material.

(2) Description of Prior Art

Silicon nitride sintered materials have been well known as engineering ceramics excellent in strength, hardness, thermal stability and chemical stability, and application of such materials to structural materials particularly useful for heat engines is now advancing.

Such a silicon nitride sintered material can be obtained by admixing a sintering assistant agent, such as oxides comprising the elements of Group IIIa in the Periodic Table and the like components, to silicon nitride powder, molding the admixed material, and calcining the molded body at 1500° C. to 2000° C. in a non-oxidative atmosphere. However, the silicon nitride sintered material obtained in such a manner, though being excellent in almost all of the properties to be required, has poor strength at high temperature. To solve the problem on deterioration of the strength at high temperature, many kinds of counterplans by improving of the sintering assistant agent or by changing the calcining atmospheres or calcining patterns have been tried so far. However, satisfactory results can not be obtained yet.

On the other hand, silicon carbide sintered materials, though being inferior to the silicon nitride sintered materials in general strength, show little deterioration of the strength at high temperature.

Therefore, in view of such properties of these two kinds of sintered materials, a composite sintered material comprising adding silicon carbide to silicon nitride and calcining the obtained admixture is now proposed. Incidentally, because of deterioration of sintering ability in the composite sintered body to be caused by addition of silicon carbide, oxides of rare earth elements, such as $Y_2O_3$ or the like component, and $Al_2O_3$ or the like material are generally added to increase the density of the whole system of the composite material.

According to the above-mentioned prior art, it becomes possible to suppress the deterioration of strength at high temperature by adding silicon carbide to silicon nitride as compared with the case of silicon nitride sintered materials. However, from minute investigation on properties at high temperature of such a composite sintered material, we the inventors found that deterioration of strength or poor creep properties can be seen when the sintered material is left for a long time in a high temperature atmosphere under load. Therefore, by the poor creep properties, it becomes difficult to carry out long-time operation of, for example, a turbine rotor to which the sintered material is applied. Accordingly, such a material is not yet sufficient to be used in practice.

However, the creep properties, though being thought to be attributable to respective granular states in the sintered material, are not grasped completely. Therefore, the improvement of properties of the sintered materials by adding silicon carbide to silicon nitride can be further advanced if the mechanism of the creep properties can be well recognized.

SUMMARY OF THE INVENTION

Therefore, we the inventors investigated the mechanism of the strength at room or high temperature and that of the high-temperature creep properties, and found that respective compositions of granular phases in the composite sintered material and polycrystalline phases of silicon nitride and silicon carbide in the same material greatly relate to these mechanisms. Moreover, from further investigation, we found that in composite sintered material containing the elements of Group IIIa in the Periodic Table as components of the sintering assistant agent, the creep properties can be greatly improved, with keeping the other high-temperature properties excellent, by adjusting the average particle size of silicon nitride at 1 µm or less, the average aspect ratio of the crystalline particles at 2 to 10, and the average size of silicon carbide crystalline particles at 1 µm or less, and controlling the total amount of Al, Mg, Ca respectively contained in the sintered material as corresponding oxides thereof at 0.5% by weight or less.

Moreover, we the inventors found that mechanical properties at high temperature and oxidation resistance under high-temperature conditions of the sintered material can be further improved by controlling the ratio between the excessive oxygen amount ($SiO_2$) and the amount of the components comprising the elements of Group IIIa in the Periodic Table within a predetermined range.

According to the present invention, there is provided a silicon nitride-silicon carbide composite sintered material which contains 100 parts by weight of a silicon nitride component containing 90 to 99.5 mol % of silicon nitride including excessive oxygen and 0.5 to 10 mol % of the elements of Group IIIa in the Periodic Table as corresponding oxides thereof and 1 to 100 parts by weight of a silicon carbide component added to the silicon nitride component in a dispersed state, wherein the silicon nitride component exists as crystalline particles having an average size of 1 µm or less and an average aspect ratio of 2 to 10, the silicon carbide component also exists as crystalline particles whose average size is 1 µm or less, and the total amount of Al, Mg, Ca respectively contained in the sintered material as corresponding oxides thereof is 0.5% by weight or less.

Moreover, according to the present invention, there is provided a method of manufacturing composite sintered materials comprising calcining a molded material in a non-oxidative atmosphere at 1900° C. or lower temperature, the molded material being so prepared that it contains 100 parts by weight of a silicon nitride component containing 92 to 99.5 mol % of silicon nitride including excessive oxygen at 0.5 to 8 mol % of oxides comprising the elements of Group IIIa listed in the Periodic Table and also contains 1 to 100 parts by weight of a silicon carbide components, and the total amount of $Al_2O_3$, MgO, CaO to the whole amount of the sintered material is controlled at 0.5% by weight or less.

As one aspect of the present invention, in the composite sintered material, the molar ratio of $SiO_2$ corresponding to the above-mentioned excessive oxygen to the amount of the oxides comprising the elements of Group IIIa in the Periodic Table is controlled at 2 or less.

More specifically, according to the composite sintered material of this type, it is possible to greatly enhance the strength under room and high temperature conditions and greatly improve the creep properties, as compared with conventional silicon nitride sintered materials.

As another aspect of the present invention, by controlling the molar ratio of $SiO_2$ corresponding to the above-mentioned excessive oxygen to the amount of the oxides comprising the elements of Group IIIa in the Periodic Table at a value more than 2, and adjusting the total amount of Al, Mg, Ca respectively contained in the sintered material is controlled at 0.5 % by weight or less, it is possible to obtain sintered materials having excellent oxidation resistance as well as excellent properties at high temperature.

DETAILED DESCRIPTION OF PREFERRED EMBODIMENT

According to the silicon nitride-silicon carbide composite sintered material of the present invention, the sintered material mainly contains a silicon nitride component and a silicon carbide component. Moreover, the silicon carbide component basically comprises silicon carbide particles only, and the silicon nitride component comprises a system containing silicon nitride including excessive oxygen as well as a sintering assistant agent to be incorporated in the sintered material.

The silicon nitride component contains 90 to 99.5 mol %, particularly 93 to 99 mol %, of silicon nitride including excessive oxygen and 0.5 to 10 mol %, particularly 1 to 7 mol %, of the elements of Group IIIa in the Periodic Table as corresponding oxides thereof. The elements of Group IIIa respectively exist in the sintered material in the form of corresponding oxides so as to enhance the sintering ability over the whole system. If the total amount of the IIIa group elements is less than 0.5 mol %, the sintering ability is impaired, so that it becomes difficult to obtain sintered material with high density, moreover, other physical properties are deteriorated. On the other hand, if the amount exceeds 10 mol %, the strength at high temperature is impaired.

According to the present invention, the silicon carbide component is added to the silicon nitride component at a ratio of 1 to 100 parts by weight to 100 parts by weight of the silicon nitride component. If the addition amount of the silicon carbide component is less than 1 part by weight, the effect of improving the properties at high temperature to be aimed by the addition of silicon carbide to silicon nitride can not be sufficiently obtained. On the other hand, if the amount exceeds 100 parts by weight, the sintering ability is impaired and the strength is deteriorated. Incidentally, from the viewpoint of general physical properties, it is preferred to control the amount of the silicon carbide component at 30 to 70 parts by weight to 100 parts by weight of the silicon nitride component.

Moreover, according to the composite sintered material of the present invention, it is important that both of the silicon nitride crystal and the silicon carbide crystal exist in the material in the form of fine particles. More specifically, the silicon nitride crystalline particles are in a needle-like shape formed by grain growth, and the average particle size (the length of the short axis) is 1 μm or less, particularly 0.8 μm or less. Moreover, the average aspect ratio of the length of the long axis to the length of the short axis is 2 to 10, particularly 3 to 9. Moreover, almost all of the silicon nitride crystalline particles are in the form of $\beta$-$Si_3N_4$, however, if circumstances require, the form may be $\alpha$-$Si_3N_4$ in part.

On the other hand, the silicon carbide crystal exists, as particles having an average particles size of 1 μm or less, particularly 0.8 μm or less, in the grain boundaries of the silicon nitride crystalline particles or in the silicon nitride crystalline particles. Incidentally, almost all of the silicon carbide crystalline particles are in the form of $\beta$-SiC, however, if circumstances require, the form may be $\alpha$-SiC in part.

If the average particle size of the silicon nitride crystalline particles exceeds 1 μm, it is caused that the sintered material is likely to be fracture origin, so that the strength of the material is deteriorated. Moreover, if the average aspect ratio is less than 2, the frequency of intertwinement between the particles becomes so low that the particles are likely to move at high temperature, thereby to deteriorate the creep properties. On the other hand, if the average particle size of the silicon carbide crystalline particles exceeds 1 μm, the sintering ability is impaired, and it becomes difficult to form the silicon nitride crystalline particles in a needle-like shape.

In the respective grain boundaries between the silicon nitride crystalline particles and the silicon carbide crystalline particles, the above-mentioned elements of Group IIIa in the Periodic Table mainly exist together with excessive oxygen in the form of $SiO_2$ or the like. The strength at high temperature can be improved by elevating the melting point of the grain boundaries, however, the creep properties depend much on the composition of these boundaries. Therefore, it is preferred to control the amount of the excessive oxygen (as $SiO_2$) in the silicon nitride component of 20 mol % or less. Moreover, it is also preferred to adjust the molar ratio between the amount of the elements of Group IIIa in the Periodic Table as corresponding oxides thereof ($RE_2O_3$) and the amount of the excessive oxygen ($SiO_2$), expressed by $SiO_2/RE_2O_3$, at 0.5 to 10, particularly 0.7 to 4.

Incidentally, the sintered material of the present invention is excellent in the properties at high temperature, however, if it is necessary to further enhance the strength and creep properties at high temperature, it is preferred that the molar ratio of $SiO_2/RE_2O_3$ is adjusted at 2 or less and some crystalline phases exist in the grain boundaries of the sintered material. More specifically, it is preferred that crystalline phases, such as YAM phase ($RE_4Si_2O_7N_2$), apatite phase ($RE_5Si_3O_{12}N$) and wollastonite phase ($RESiO_2N$), preferably apatite phase, are formed in the grain boundaries. Particularly, in order to form the apatite phase, it is necessary to control the molar ratio of $SiO_2/RE_2O_3$ within the range of 0.8 to 1.1.

On the other hand, if it is necessary to enhance the oxidation resistance at high temperature, the molar ratio of $SiO_2/RE_2O_3$ is controlled to exceed 2, preferably 2.5. In this case, it is effective for enhancing the properties at high temperature that some crystalline phases are formed in the grain boundaries of the sintered material. More specifically, it is preferred that crystalline phases, such as silicon oxynitride ($Si_2N_2O$) phase and disilicate ($RE_2Si_2O_7$) phase, are formed in the grain boundaries.

If $Al_2O_3$, CaO, MgO which are conventionally used for enhancing the sintering ability are used as components for constructing the grain boundaries, they exist mainly in the grain boundaries and partly in the silicon nitride crystalline particles in a solid solution state. However, when these components are in the grain boundaries, the melting point of each grain boundary is lowered, and the crystallizability of the boundary is deteriorated, moreover, the strength at high temperature as well as the creep properties is impaired because of reduction of the viscosity at high temperature.

Therefore, it is very important to control the total amount of the metal elements Al, Ca, Mg existing in the sintered material as corresponding oxides thereof at 0.5% by weight or less, particularly 0.4% by weight or less.

Incidentally, as the elements of Group IIIa in the Periodic Table used in the present invention, Y, Sc, Er, Yb, Ho and Dy can be mentioned. However, among these elements, Y is likely to cohere in the sintered material so as to generate extraordinary grain growth. Therefore, it is particularly preferred to use Er, Yb.

Next, a method of manufacturing the silicon nitride-silicon carbide composite sintered material of the present invention is described. First, silicon nitride powder, silicon carbide powder and oxides of the elements of Group IIIa in the Periodic Table, and if required, silicon oxide powder are used as starting materials.

As the silicon nitride powder, either of the α type and the β type can be used. Preferably, the average particle size is 1 μm or less and the amount of the oxygen is 2% by weight or less. Likewise, as the silicon carbide powder, either of the α type and the β type can be also used. Moreover, it is preferred that the average particle size is 1 μm or less and the amount of the oxygen is 2% by weight or less. Incidentally, though these silicon nitride powder and silicon carbide powder can be used separately, it is also possible to use powder containing silicon nitride and silicon carbide in a composite state at a predetermined ratio.

Next, by using the above-mentioned powder, the silicon carbide component is weighted at 1 to 100 parts by weight to 100 parts by weight of the silicon nitride component containing 90 to 99.5 mol % of silicon nitride including excessive oxygen and 0.5 to 10 mol % of the oxides of the elements of Group IIIa in the Periodic Table. Then, these components are mixed well, and formed into a desired shape by a well-known forming method, for example, press forming, injection forming, extrusion forming, slip-cast forming and cold isostatic pressure forming.

Incidentally, to keep the total amount of Al, Mg, Ca contained as calculated as oxides thereof in the resultant green compact at 0.5% by weight or less, it is necessary to avoid further including these metal elements into the green compact through the above-mentioned process. For avoiding such unnecessary inclusion, it is necessary to use a starting material containing an allowability small amount of the metal elements or to use such a ball as to suppress the admixture when the silicon nitride component and the silicon carbide component are mixed together.

Next, the green compact obtained by the above-mentioned manner is sintered at 1900° C. or less, particularly 1450° to 1850° C., in a non-oxidative atmosphere containing nitrogen. Incidentally, as the sintering method, pressureless sintering, hot press sintering, nitrogen gas pressure sintering (GPS sintering) and hot hydrostatic pressure sintering (HIP sintering) can be adopted. If required, these sintering methods can be used together in combination.

Incidentally, it the sintering temperature exceeds 1900° C., the silicon nitride crystalline particles grow excessively in the sintered body, so that the strength is deteriorated.

In this case, since low melting-point materials such as $Al_2O_3$ are not contained in the sintered material, the sintering ability is likely to be deteriorated. However, to solve this problem, the green compact is once sintered by ordinary sintering method or GPS sintering to obtain a sintered body in which the theoretical relative density is 90% or more, and the sintered body is then further subjected to HIP sintering at 1450° to 1900° C. in the atmosphere of nitrogen or argon gas under 50 MPa or more. Otherwise, the molded body is subjected to the HIP calcining under the same condition as mentioned above through a glass film, so as to obtain a high-density sintered body.

Subsequently, the sintered body obtained is heated at 1100° to 1600° C. in a non-oxidative atmosphere to crystallize the grain boundaries in the sintered body. As a result, a well-known crystalline phase of, for example, the $Si_3N_4$-$RE_2O_3$-$SiO_2$ type (RE: one kind of the elements of Group IIIa in the Periodic Table) is precipitated, thereby to enhance the properties at high temperature.

Namely, in the present invention, silicon carbide has an effect of suitably suppressing the grain growth of the silicon nitride crystal so that the silicon nitride crystalline particles are dispersed in the system as fine particles. Therefore, it becomes possible to suppress failure of the entire system to be caused by crystalline particles having an excessively large average particle size as seen in ordinary silicon nitride sintered bodies. As a result, flexural strength at high temperature can be greatly improved.

Moreover, since the grain boundaries are substantially constructed with oxides of the elements of Group IIIa in the Periodic Table, excessive oxygen ($SiO_2$) and silicon nitride, and the amount of low melting-point oxides such as $Al_2O_3$ is reduced as small as possible, it becomes possible to elevate the melting point of the grain boundaries as well as the viscosity thereof. As a result, the strength at high temperature and the creep properties can be improved. In addition, by controlling the ratio of $SiO_2/RE_2O_3$, the oxidation resistance at high temperature can be also enhanced.

As stated above, according to the present invention, since both of the silicon nitride crystal and the silicon carbide crystal exist as fine particles in a silicon nitride-silicon carbide composite sintered material, and the grain boundaries between these crystalline particles are constructed with the above-mentioned specific compositions, it becomes possible to suppress deterioration of the strength at high temperature to be caused by using a composite material and realize excellent creep properties. Moreover, owing the adjustment of the composition ratio of the grain boundaries, the oxidation resistance at high temperature of the sintered material can be improved. As a result, the composite sintered material according to the present invention can be adopted as structural materials for constructing heat engines such as gas turbines or turborotors, moreover, it can be also used as heat-resistant materials for constructing other machines.

The following Examples illustrate the present invention more specifically.

Example 1

As starting materials, silicon nitride powder containing 98% by weight of α-$Si_3N_4$ and 1.3% by weight of oxygen and having an average particle size of 0.5 to 0.8 μm, silicon carbide powder having an average particle size of 0.3 to 1.5 μm, powder of $Y_2O_3$, $Sc_2O_3$, $Er_2O_3$, $Yb_2O_3$, $Ho_2O_3$ or $Dy_2O_3$ in which the average particle size is 0.5 μm, and silicon oxide powder were used. First, these components were respectively weighted and mixed at the respective composition ratios as listed in Table 1, and then pulverized in methanol in the presence of binder. The obtained slurry was dried and granulated, and was then subjected to press forming under pressure of 1 ton/cm². Thereafter the obtained green compact was subjected to hot-press sintering or HIP sintering in a nitrogen atmosphere under the condition shown in Table 1.

Incidentally, in Table 1, the test specimen No. 22 was prepared as a comparative example by further adding 1% by weight of $Al_2O_3$ powder based on the whole amount to the composition of the test specimen No. 4.

To each of the obtained sintered bodies, the relative density was measured by the Archimedes' method, the four-point bending flexural strength at room temperature and 1400° C. was measured based on JIS R1601, and the respective average particle sizes and average aspect ratios of the silicon nitride crystal and the silicon carbide crystal were measured by the scanning electron microscope. Moreover, the crystalline phase in the grain boundaries was identified by the X-ray diffractometry.

Moreover, the time required for breaking each test specimen under load of 80 ksi, 90 ksi with heating at 1400° C. for 100 hours or shorter was measured. Incidentally, the amount of the elements of Group IIIa in the Periodic Table contained in each specimen was measured by the Inductively Coupled Plasma Luminescence Spectrum Analysis (ICP analysis) method, while the total amount of oxygen in the same specimen was measured by an oxygen-nitrogen simultaneous analyzer. Then, the amount of oxygen included in the sintered body as oxides, example for the oxides ($RE_2O_3$) of the elements of Group IIIa in the Periodic Table, other than $SiO_2$ was substracted from the total oxygen amount obtained as mentioned above. Subsequently, the amount of oxygen corresponding to the substraction result was converted into $SiO_2$ as excessive oxygen, so as to obtain the molar ratio of $SiO_2/RE_2O_3$. Each result is shown in Table 2.

In each test case shown in Table 2 not given measurement values of the creep properties at high temperature, the test specimen was broken immediately after the test was started.

As is seen from Tables 1 and 2, in case of the test specimen No. 1 tested as a conventional silicon nitride sintered body to which no silicon carbide, the strength at 1400° C. is about 600 MPa, and its creep properties under load of 80 ksi shows that the specimen was almost broken immediately. Meanwhile, in case of the test specimen No. 2 in which the addition amount of silicon carbide to silicon nitride is less than 1 part by weight, the property improvement can not be seen so markedly. Moreover, with respect to the test specimen No. 6 where the addition amount of silicon carbide exceeds 100 parts by weight, the respective properties are greatly deteriorated.

To the contrary, in case of each test specimen where a suitable amount of silicon carbide is added to silicon nitride, and the particle sizes of the respective crystalline components are well controlled in accordance with the present invention, both strength and creep properties at high temperature can be greatly improved. However, as shown in case of the specimen No. 21 where the density is well controlled, but the sintering temperature is relatively high, the particle size of the silicon nitride crystal becomes relatively large as well as the aspect ratio, so that the creep properties at high temperature is impaired. Moreover, as seen from the specimen No. 8, no property improvement is recognized even if the particle size of silicon carbide is relatively large. Besides, as shown in case of the specimen No. 10 where the amount of the oxides of the elements of Group IIIa in the Periodic Table as the sintering assistant agent or in case of the specimen No. 13 where the oxide is excessively added, the respective properties are rejectively low.

Moreover, in case of the test specimen No. 22 where the total amount of oxides of Al, Mg, Ca exceeds 0.5% by weight (though the amount is 0.2% by weight or less in any one of the specimens Nos. 1 to 21,) we could obtain a sintered body having excellent sintering ability and 100% relative density. However, with respect to the other properties, the strength measured at 1400° C. is very small as compared with the specimens according to the present invention, moreover, the creep properties show that breakage immediately occurs even under load of 70 ksi or less.

Example 2

As starting materials, silicon nitride powder containing 98% by weight of $\alpha$-$Si_3N_4$, and 1.3% by weight of oxygen and having an average particle size of 0.6 μm, silicon carbide powder having an average particle size of 0.3 μm, powder of $Y_2O_3$, $Sc_2O_3$, $Er_2O_3$, $Yb_2O_3$, $Ho_2O_3$ or $Dy_2O_3$ in which the average particle size is 0.5 μm, and silicon oxide powder were used. First, these components were respectively weighted and mixed at the respective composition ratios as listed in Table 1, and then pulverized in methanol in the presence of binder. The obtained slurry was dried and granulated, and was then subjected to press forming under pressure of 1 ton/cm².

Thereafter, each green compact obtained was subjected to sintering under the condition shown in Table 3 in a nitrogen atmosphere where the nitrogen gas pressure was 10 atoms and 333 kg/cm².

With respect to each of the obtained sintered bodies, the four-point-bending flexural strength at room temperature and 1400° C. was measured based on JIS R1601, and the respective average particle sizes and average aspect ratios of the silicon nitride crystal and the silicon carbide crystal were measured by the electron micrograph.

Moreover, the time required for breaking each test specimen under load of 80 ksi, 90 ksi with heating at 1371° C. for 100 hours or shorter time was measured.

Incidentally, the amount of the elements of Group IIIa in the Periodic Table contained in each specimen was measured by the ICP analysis method, while the total amount of oxygen in the same specimen was measured by an oxygen-nitrogen simultaneous analyzer. Then, the amount of oxygen included in the sintered body as oxides, example for the oxides ($RE_2O_3$) of the elements of Group IIIa in the Periodic Table, other than $SiO_2$ was subtracted from the total oxygen amount obtained as mentioned above. Subsequently, the amount of oxygen corresponding to the substraction result was converted into $SiO_2$ as excessive oxygen, so as to obtain the molar ratio of $SiO_2/RE_2O_3$. Each result is shown in Table 4.

From the data shown in Tables 3 and 4, it can be seen that with respect to the specimen No. 13 to which no SiC is added, the strength at 1400° C. is about 500 MPa, and the creep properties show that the sintered body is broken immediately even under load of 80 ksi or less. Moreover, it can be also understood that both of the strength at high temperature and the creep properties can be improved if SiC is suitably added to the sintered body.

Incidentally, in any one of the test specimens shown in Tables 3 and 4, the particle size (length of the short axis) od $Si_3N_4$ is 0.6 μm, and the aspect ratio is 3 to 5. Moreover, SiC is dispersed in the system an particles with a particle size of 0.3 to 0.5 μm.

However, with respect to the specimen No. 11 where the oxides of the elements of Group IIIa in the Periodic Table are excessively added, the strength at high temperature is deteriorated. Moreover, also in case of the test specimen No. 14 which contains $Al_2O_3$, the strength at high temperature and the creep properties are impaired.

On the other hand, in any one of the test specimens whose composition is specifically controlled in accordance with the present invention, the strength at 1400° C. is improved at 800 MPa or higher, and the creep properties under load of 80 ksi are increased to 50 hr or longer.

Example 3

As starting materials, silicon nitride powder containing 98% by weight of α-$Si_3N_4$ and 1.3% by weight of oxygen and having an average particle size of 0.6 μm, silicon carbide powder having an average particle size of 0.5 μm, powder of $Y_2O_3$, $Sc_2O_3$, $Er_2O_3$, $Yb_2O_3$, $Ho_2O_3$ or $Dy_2O_3$ with an average particle size of 0.5 μm and silicon oxide powder were used. These components were respectively weighed and mixed, and then pulverized in methanol in the presence of binder. The obtained slurry was dried and granulated, and was then subjected to press forming under pressure of 1 ton/cm².

Thereafter, each green compact obtained was coated with BN powder, and then subjected hot isostatic pressure sintering in a glass vessel. However, the test specimen No. 20 was subjected to nitrogen gas pressure sintering, and the specimen No. 21 was sintered by the hot press method. Incidentally, the inclusion amount of $Al_2O_3$, MgO or CaO to each specimen during the above process was suppressed as low as possible so as not to exceed 0.1% by weight.

With respect to each of the obtained sintered bodies, the four-point-bending flexural strength at room temperature and 1400° C. was measured based on JIS R1601. Besides, after the specimen was subjected to oxidation treatment in the air at 900° C. for 200 hours, the four-point-bending flexural strength at 1400° C. was measured.

Incidentally, the amount of the elements of Group IIIa in the Periodic Table contained in each specimen was measured by the ICP analysis method, while the total amount of oxygen in the same specimen was measured by an oxygen-nitrogen simultaneous analyzer. Then, the amount of oxygen included in the sintered body as oxides, example for the oxides ($RE_2O_3$) of the elements of Group IIIa in the Periodic Table, other than $SiO_2$ was subtracted from the total oxygen amount obtained as mentioned above. Subsequently, the amount of oxygen corresponding to the substraction result was converted into $SiO_2$ as excessive oxygen, so as to obtain the molar ration of $SiO_2/RE_2O_3$. Each result is shown in Table 5.

As seen from Table 5, in case of the specimen No. 1 in which the amount of the rare earth elements in the silicon nitride component is relatively small, sintering is not completed. While, in case of the specimen No. 4 where the amount of the rare earth elements exceeds 10 mol %, the strength at high temperature is impaired. Moreover, in any case of the specimens Nos. 5 to 7 where the ratio of $SiO_2/RE_2O_3$ is less than 2, the strength at 1400° C. after oxidation is drastically deteriorated. Therefore, these three cases are all inferior in the oxidation resistance. Besides, with respect to the specimen No. 16 where the amount of the silicon carbide exceeds 100 parts by weight, sintering is not completed over the whole body.

As compared with the data of these comparative examples, in any case of the test specimens according to the present invention, the strength at 1400° C. is 700 MPa or higher, and almost no deterioration is seen in the strength after oxidation. Therefore, about 90% of the strength is maintained through the oxidation treatment.

Incidentally, in any one of the test specimens related to the present invention, the particle size (length of the short axis) of the silicon nitride crystalline particles is 0.5 to 0.7 μm, and the aspect ratio is 4 to 6. Moreover, the average particle size of SiC is 0.5 to 0.6 μm. Therefore, the system of the sintered body is finely constructed.

Example 4

The sintered bodies respectively corresponding to the specimens Nos. 2, 11, 12, 13 obtained in Example 3 were all subjected to heat treatment at 1500° C. in a nitrogen atmosphere to crystallize the grain boundaries thereof.

As a result, crystalline phases consisting of $Si_2N_2O$ and $Y_2O_3.2SiO_2$ were detected from all of these specimens. Moreover, the values of strength at 1400° C. of the specimens corresponding to Nos 2, 11, 12, 13 were 850 MPa, 820 MPa, 840 MPa, 830 MPa respectively. Namely, these strength value obtained by the above-mentioned heat treatment were all higher than the strength shown in Table 5.

Example 5

$Al_2O_3$ was added to the composition of the specimen No. 2 in Example 3 to prepare three kinds of sintered bodies in which the total amount of $Al_2O_3$, CaO, MgO were 0.3%, 0.7% and 1.0% by weight respectively. As a result, the relative density measured with respect to all of the obtained sintered bodies was 100%. Accordingly, all of these specimens were well sintered. However, with respect to the strength at 1400° C., the values were 780 MPa, 670 MPa, 600 MPa respectively. Therefore, it can be seen that the strength is steeply deteriorated when the total addition amount of $Al_2O_3$, CaO, MgO exceeds 0.5% by weight.

TABLE 1

| Test Specimen No. 1) | Silicon Nitride Component | | | | $SiO_2$/$RE_2O_3$ (molar ratio) |
|---|---|---|---|---|---|
| | SN particle size(μm) | $Si_3N_4$ (mol %) | $RE_2O_3$ (mol %) | $SiO_2$ (mol %) | |
| *1 | 0.5 | 88.75 | $Y_2O_3$ 4.5 | 6.75 | 1.5 |
| *2 | 0.5 | 88.75 | $Y_2O_3$ 4.5 | 6.75 | 1.5 |
| 3 | 0.5 | 88.75 | $Y_2O_3$ 4.5 | 6.75 | 1.5 |
| 4 | 0.5 | 88.75 | $Y_2O_3$ 4.5 | 6.75 | 1.5 |
| 5 | 0.5 | 88.75 | $Y_2O_3$ 4.5 | 6.75 | 1.5 |
| *6 | 0.5 | 88.75 | $Y_2O_3$ 4.5 | 6.75 | 1.5 |
| 7 | 0.5 | 88.75 | $Y_2O_3$ 4.5 | 6.75 | 1.5 |
| *8 | 0.5 | 88.75 | $Y_2O_3$ 4.5 | 6.75 | 1.5 |
| 9 | 0.8 | 88.75 | $Y_2O_3$ 4.5 | 6.75 | 1.5 |
| *10 | 0.5 | 95.2 | $Y_2O_3$ 0.3* | 4.5 | 15 |
| 11 | 0.5 | 95.0 | $Y_2O_3$ 2.0 | 3.0 | 1.5 |
| 12 | 0.5 | 80.0 | $Y_2O_3$ 8.0 | 12.0 | 1.5 |
| *13 | 0.5 | 62.5 | $Y_2O_3$ 15.0 | 22.5 | 1.5 |
| 14 | 0.5 | 73.0 | $Y_2O_3$ 4.5 | 22.5 | 5 |
| 15 | 0.5 | 88.75 | $Sc_2O_3$ 4.5 | 6.75 | 1.5 |
| 16 | 0.5 | 88.75 | $Er_2O_3$ 4.5 | 6.75 | 1.5 |
| 17 | 0.5 | 88.75 | $Yb_2O_3$ 4.5 | 6.75 | 1.5 |
| 18 | 0.5 | 88.75 | $Ho_2O_3$ 4.5 | 6.75 | 1.5 |
| 19 | 0.5 | 88.75 | $Dy_2O_3$ 4.5 | 6.75 | 1.5 |
| 20 | 0.5 | 88.75 | $Y_2O_3$ 4.5 | 6.75 | 1.5 |
| *21 | 0.5 | 88.75 | $Y_2O_3$ 4.5 | 6.75 | 1.5 |
| *22 | 0.5 | 88.75 | $Y_2O_3$ 4.5 $Al_2O_3$ added) | 6.75 | 1.5 |

| Test | Silicon Carbide Component | | |
|---|---|---|---|
| | SC | Blending Amount 2) | Sintering Condition |

TABLE 1-continued

| Specimen No. 1) | particle size (μm) | (Weight parts) | Temperature (°C.) | Pressure (MPa) | Time (Hr) |
|---|---|---|---|---|---|
| *1 | — | — | 1750 | 196 | 1 |
| *2 | 0.3 | 0.5 | 1750 | 196 | 1 |
| 3 | 0.3 | 30 | 1750 | 196 | 1 |
| 4 | 0.3 | 55 | 1750 | 196 | 1 |
| 5 | 0.3 | 80 | 1750 | 196 | 1 |
| *6 | 0.3 | 120 | 1750 | 196 | 1 |
| 7 | 0.8 | 55 | 1750 | 196 | 1 |
| *8 | 1.5 | 55 | 1750 | 196 | 1 |
| 9 | 0.3 | 55 | 1750 | 196 | 1 |
| *10 | 0.3 | 55 | 1750 | 196 | 1 |
| 11 | 0.3 | 55 | 1750 | 196 | 1 |
| 12 | 0.3 | 55 | 1750 | 196 | 1 |
| *13 | 0.3 | 55 | 1750 | 196 | 1 |
| 14 | 0.3 | 55 | 1750 | 196 | 1 |
| 15 | 0.3 | 55 | 1750 | 196 | 1 |
| 16 | 0.3 | 55 | 1750 | 196 | 1 |
| 17 | 0.3 | 55 | 1750 | 196 | 1 |
| 18 | 0.3 | 55 | 1750 | 196 | 1 |
| 19 | 0.3 | 55 | 1750 | 196 | 1 |
| 20 | 0.3 | 55 | 1850 | 34 | 4 |
| *21 | 0.3 | 55 | 1950 | 34 | 4 |
| *22 | 0.3 | 55 | 1850 | 34 | 4 |

Note
1) The asterisk shows test specimens departing from the scope of the present invention
2) The blending amount of the silicon carbide component is shown by a ratio to 100 parts by weight of the silicon nitride component.

TABLE 2

| Test Specimen No. 1) | SN Average Particle Size (μm) | SN Aspect Ratio | SC Average Particle Size (μm) | $SiO_2/RE_2O_3$ (molar ratio) | Relative Density (%) |
|---|---|---|---|---|---|
| *1 | 1.0 | 12 | 0.3 | 0.9 | 100 |
| *2 | 1.2 | 9 | 0.3 | 0.9 | 100 |
| 3 | 0.9 | 7 | 0.3 | 0.8 | 100 |
| 4 | 0.7 | 8 | 0.3 | 0.8 | 100 |
| 5 | 0.6 | 7 | 0.3 | 0.8 | 100 |
| *6 | 1.0 | 5 | 0.3 | 1.0 | 93 |
| 7 | 0.6 | 7 | 0.8 | 0.9 | 100 |
| *8 | 0.5 | 5 | 1.5 | 1.0 | 98 |
| 9 | 1.0 | 6 | 0.3 | 0.7 | 100 |
| *10 | 1.3 | 9 | 0.3 | 7.0 | 87 |
| 11 | 0.7 | 9 | 0.3 | 0.9 | 100 |
| 12 | 0.7 | 8 | 0.3 | 0.8 | 100 |
| *13 | 0.6 | 8 | 0.3 | 1.0 | 100 |
| 14 | 0.5 | 9 | 0.3 | 2.8 | 100 |
| 15 | 0.7 | 7 | 0.3 | 0.9 | 100 |
| 16 | 0.5 | 9 | 0.3 | 0.8 | 100 |
| 17 | 0.5 | 9 | 0.3 | 0.9 | 100 |
| 18 | 0.6 | 8 | 0.3 | 0.9 | 100 |
| 19 | 0.7 | 7 | 0.3 | 0.8 | 100 |
| 20 | 0.5 | 8 | 0.3 | 1.0 | 100 |
| *21 | 1.5 | 12 | 0.3 | 0.5 | 100 |
| *22 | 1.0 | 9 | 0.5 | 0.5 | 100 |

Flexural Strength

TABLE 2-continued

| Test Specimen No. 1) | (MPa) Room Temp. | (MPa) 1400° C. | Creep Properties 80 ksi | Creep Properties 90 ksi | Grain Boundary Crystalline Phase 2) |
|---|---|---|---|---|---|
| *1 | 950 | 600 | — | — | AP |
| *2 | 1100 | 700 | 10 hr | — | AP |
| 3 | 1200 | 850 | 100 hr | 40 hr | AP |
| 4 | 1300 | 900 | 100 hr | 60 hr | AP |
| 5 | 1300 | 800 | 100 hr | 30 hr | AP |
| *6 | 800 | 500 | — | — | AP |
| 7 | 1300 | 800 | 100 hr | 30 hr | AP |
| *8 | 900 | 600 | 1 min | — | AP |
| 9 | 1250 | 800 | 100 hr | 40 hr | AP, W |
| *10 | sintering was not completed | | | | — |
| 11 | 1200 | 800 | 100 hr | 30 hr | AP |
| 12 | 1250 | 800 | 100 hr | 20 hr | AP |
| *13 | 1000 | 500 | | — | AP |
| 14 | 1350 | 700 | 100 hr | 40 hr | SNO, R2S |
| 15 | 1300 | 800 | 100 hr | 30 hr | AP |
| 16 | 1300 | 900 | 100 hr | 60 hr | AP |
| 17 | 1350 | 850 | 100 hr | 50 hr | AP |
| 18 | 1250 | 800 | 100 hr | 30 hr | AP |
| 19 | 1250 | 850 | 100 hr | 40 hr | AP |
| 20 | 1250 | 850 | 100 hr | 50 hr | AP |
| *21 | 950 | 750 | 35 hr | — | W, Y |
| *22 | 900 | 650 | — | — | no crystal phase |

Note
1) The asterisk (*) shows test specimens departing from the scope of the present invention.
2) The abbreviations shown in this table designate the following phases, respectively.
AP: $RE_5Si_3O_{12}N$ (Apatite phase)
W: $RESiO_2N$ (Wollastonite phase)
Y: $RE_4Si_2O_7N_2$ (YAM phase)
SNO: $Si_2N_2O$ (Silicon oxynitride phase)
R2S: $RE_2O_3 \cdot 2SiO_2$ (Disilicate)

TABLE 3

| Test Specimen No. 1) | Silicon Nitride Component 2) $RE_2O_3$ | Silicon Nitride Component 2) $Si_3N_4$ | Silicon Nitride Component 2) $SiO_2$ | Silicon Nitride Component 2) Others | $SiO_2/RE_2O_3$ | Silicon Carbide Component 3) (Weight parts) |
|---|---|---|---|---|---|---|
| 1 | $Er_2O_3$ 4.0 | 92 | 4.0 | — | 1.0 | 20 |
| 2 | $Er_2O_3$ 4.6 | 91.7 | 3.7 | — | 0.8 | 40 |
| 3 | $Er_2O_3$ 5.0 | 92 | 3.0 | — | 0.6 | 60 |
| 4 | $Er_2O_3$ 5.9 | 90.6 | 3.5 | — | 0.6 | 60 |
| 5 | $Er_2O_3$ 5.7 | 90.9 | 3.4 | — | 0.6 | 80 |

TABLE 3-continued

| Test Specimen No. 1) | Silicon Nitride Component 2) | | | | $SiO_2/RE_2O_3$ | Silicon Carbide Component 3) (Weight parts) |
|---|---|---|---|---|---|---|
| | $RE_2O_3$ | $Si_3N_4$ | $SiO_2$ | Others | | |
| 6 | $Er_2O_3$ 5.3 | 89.9 | 4.8 | — | 0.9 | 80 |
| 7 | $Er_2O_3$ 5.5 | 91.2 | 3.3 | — | 0.6 | 100 |
| *8 | $Er_2O_3$ 5.5 | 91.2 | 3.3 | — | 0.6 | 120 |
| 9 | $Er_2O_3$ 4.5 | 88.75 | 6.75 | — | 1.5 | 40 |
| 10 | $Er_2O_3$ 7.0 | 90.2 | 2.8 | — | 0.4 | 40 |
| *11 | $Er_2O_3$ 11.0 | 84.6 | 4.4 | — | 0.4 | 40 |
| *12 | $Er_2O_3$ 0.3 | 99.4 | 0.3 | — | 1.0 | 40 |
| *13 | $Er_2O_3$ 5.0 | 92.0 | 3.0 | — | 0.6 | not added |
| *14 | $Er_2O_3$ 5.0 | 90.0 | 3.0 | $Al_2O_3$ 2.0 | 0.6 | 40 |

Note
1) The asterisk (*) shows test specimens departing from the scope of the present invention.
2) The amount of excessive oxygen was converted into the corresponding amount Of $SiO_2$.
3) The ratio to 100 parts by weight of the silicon nitride component.

TABLE 4

| Test Specimen No. 1) | Sintering Condition Temp. (°C.) × Time (Hr) | SN Average Particle Size (μm) | Flexural Strength (MPa) | | Creep Properties | |
|---|---|---|---|---|---|---|
| | | | Room Temp. | 1400° C. | 80 ksi | 90 ksi |
| 1 | 1700 × 1–1850 × 4 | 0.6 | 1390 | 809 | 100 hr | — |
| 2 | 1700 × 1–1850 × 4 | 0.6 | 1350 | 801 | 100 hr | — |
| 3 | 1700 × 1–1850 × 4 | 0.6 | 1358 | 845 | 100 hr | 54 hr |
| 4 | 1600 × 1–1850 × 4 | 0.6 | 1293 | 832 | 100 hr | 32 hr |
| 5 | 1600 × 1–1850 × 4 | 0.6 | 1320 | 888 | 100 hr | 69 hr |
| 6 | 1700 × 1–1850 × 4 | 0.6 | 1260 | 803 | 100 hr | — |
| 7 | 1700 × 1–1850 × 4 | 0.6 | 1301 | 843 | 100 hr | 45 hr |
| *8 | 1700 × 1–1850 × 4 | 0.6 | 623 | 419 | — | — |
| 9 | 1700 × 1–1850 × 4 | 0.6 | 751 | 704 | 42 hr | — |
| 10 | 1700 × 1–1850 × 4 | 0.6 | 1110 | 714 | 21 hr | — |
| *11 | 1700 × 1–1850 × 4 | 0.6 | 1003 | 324 | — | — |
| *12 | 1700 × 1–1850 × 4 | 0.6 | Sintering was not completed | | | |
| *13 | 1700 × 1–1850 × 4 | 1.1 | 909 | 542 | — | — |
| *14 | 1700 × 1–1850 × 4 | 0.7 | 714 | 421 | — | — |

Note
1) The asterisk(*) shows test specimens departing from the scope of the present invention

TABLE 5

| Test Specimen No. | Silicon Nitride Component | | | | Silicon Carbide Component (Weight parts) | Sintering Condition | | | Strength at 1400° C. before Oxidation (MPa) | Relative Strength at 1400° C. after oxidation/ before Oxidation |
|---|---|---|---|---|---|---|---|---|---|---|
| | $Si_3N_4$ (mol %) | $RE_3O_4$ (mol %) | $SiO_2$ (mol %) | $SiO_2/RE_3O_4$ (molar ratio) | | Temp. (°C.) | Time (hr) | Pressure (MPa) | | |
| *1 | 99.6 | $Y_2O_3$ 0.1 | 0.3 | 3 | 10 | 1700 | 1 | 196 | — | sintering was not completed |
| 2 | 84.0 | $Y_2O_3$ 4.0 | 12.0 | 3 | 10 | 1700 | 1 | 196 | 800 | 100% |
| 3 | 72.0 | $Y_2O_3$ 7.0 | 21.0 | 3 | 10 | 1700 | 1 | 196 | 770 | 98% |
| *4 | 40.0 | $Y_2O_3$ 15.0 | 45.0 | 3 | 10 | 1700 | 1 | 196 | 550 | 95% |
| 5 | 87.4 | $Y_2O_3$ 7.0 | 5.6 | 0.8 | 10 | 1700 | 1 | 196 | 810 | 78% |
| 6 | 86.0 | $Y_2O_3$ 7.0 | 7.0 | 1 | 10 | 1700 | 1 | 196 | 800 | 81% |
| 7 | 90.0 | $Y_2O_3$ 4.0 | 6.0 | 1.5 | 10 | 1700 | 1 | 196 | 800 | 82% |
| 8 | 86.0 | $Y_2O_3$ 4.0 | 10.0 | 2.5 | 10 | 1700 | 1 | 196 | 720 | 99% |
| 9 | 76.0 | $Y_2O_3$ 4.0 | 20.0 | 5 | 10 | 1700 | 1 | 196 | 740 | 100% |
| 10 | 84.0 | $Y_2O_3$ 1.0 | 15.0 | 15 | 10 | 1700 | 1 | 196 | 800 | 100% |
| 11 | 84.0 | $Y_2O_3$ 4.0 | 12.0 | 3 | 5 | 1700 | 1 | 196 | 750 | 96% |
| 12 | 84.0 | $Y_2O_3$ 4.0 | 12.0 | 3 | 30 | 1700 | 1 | 196 | 790 | 100% |
| 13 | 84.0 | $Y_2O_3$ 4.0 | 12.0 | 3 | 50 | 1700 | 1 | 196 | 780 | 98% |

TABLE 5-continued

| Test Specimen No. | Silicon Nitride Component | | | | Silicon Carbide Component (Weight parts) | Sintering Condition | | | Strength at 1400° C. before Oxidation (MPa) | Relative Strength at 1400° C. after oxidation/ before Oxidation |
|---|---|---|---|---|---|---|---|---|---|---|
| | Si$_3$N$_4$ (mol %) | RE$_3$O$_4$ (mol %) | SiO$_2$ (mol %) | SiO$_2$/RE$_3$O$_4$ (molar ratio) | | Temp. (°C.) | Time (hr) | Pressure (MPa) | | |
| 14 | 84.0 | Y$_2$O$_3$ 4.0 | 12.0 | 3 | 70 | 1700 | 1 | 196 | 770 | 95% |
| 15 | 84.0 | Y$_2$O$_3$ 4.0 | 12.0 | 3 | 90 | 1700 | 1 | 196 | 720 | 93% |
| *16 | 84.0 | Y$_2$O$_3$ 4.0 | 12.0 | 3 | 110 | 1700 | 1 | 196 | — | sintering was not completed |
| 17 | 84.0 | Br$_2$O$_3$ 4.0 | 12.0 | 3 | 10 | 1700 | 1 | 196 | 810 | 99% |
| 18 | 84.0 | Yb$_2$O$_3$ 4.0 | 12.0 | 3 | 10 | 1700 | 1 | 196 | 800 | 98% |
| 19 | 84.0 | Sc$_2$O$_3$ 4.0 | 12.0 | 3 | 10 | 1700 | 1 | 196 | 810 | 99% |
| 20 | 84.0 | Y$_2$O$_3$ 4.0 | 12.0 | 3 | 10 | 1800 | 1 | 98 | 790 | 97% |
| 21 | 84.0 | Y$_2$O$_3$ 4.0 | 12.0 | 3 | 10 | 1950 | 5 | 1 | 720 | 98% |
| 22 | 84.0 | Y$_2$O$_3$ 4.0 | 12.0 | 3 | 10 | 1800 | 1 | 34 | 770 | 98% |

Note
The asterisk(*) shows test specimens departing from the scope of the present invention.

We claim:

1. A silicon nitride silicon carbide composite sintered material which comprises:

100 parts by weight of a silicon nitride component containing 90 to 99.5 mol % silicon nitride including excessive oxygen and 0.5 to 10 mol % of at least one element of Group IIIa in the Periodic Table calculated as oxides thereof, wherein the amount of excessive oxygen calculated as oxides of silicon present in the silicon nitride is not greater than 20 mol % of the silicon nitride; and 1 to 100 parts by weight of a silicon carbide component, wherein the silicon nitride exists as needle shaped crystalline particles having a short axis, an average size along the short axis of 1 µm or less and an average aspect ratio of 2 to 10, the silicon carbide exists as crystalline particles whose average particle size is 1 µm or less, said silicon carbide component is dispersed in the silicon nitride crystalline particles or in grain boundaries thereof, and the excessive oxygen and the at least one element of Group IIIa in the Periodic Table exist in grain boundaries between the silicon nitride crystalline particles and the silicon carbide crystalline particles in a molar ratio, calculated as an SiO$_2$/RE$_2$O$_3$ molar ratio, of from 0.5 to 10, where SiO$_2$ is the conversion amount to the excessive oxygen and RE$_2$O$_3$ is an oxide calculated as the at least one element of Group IIIa in the Periodic Table, and where the sintered material contains at least one element selected from Al, Mg and Ca in a total amount controlled to less than 0.5% by weight calculated as an oxide thereof.

2. A composite sintered material according to claim 1, wherein the silicon nitride component contains 93 to 99 mol % of silicon nitride and 1 to 7 mol % of the elements of Group IIIa in the Periodic Table as calculated as oxides thereof.

3. A composite sintered material according to claim 1, containing 30 to 70 parts by weight of silicon carbide component per 100 parts by weight of silicon nitride component.

4. A composite sintered material according to claim 1 wherein the Group IIIa element of the Periodic Table is at least one member selected from the group consisting of Er and Yb.

5. A silicon nitride-silicon carbide composite sintered material which comprises:

100 parts by weight of a silicon nitride component containing 90 to 99.5 mol % silicon nitride including excessive oxygen and 0.5 to 10 mol % of at least one element of Group IIIa in the Periodic Table calculated as oxides thereof, wherein the amount of excessive oxygen calculated as oxides of silicon present in the silicon nitride is not greater than 20 mol % of the silicon nitride; and 1 to 100 parts by weight of a silicon carbide component, wherein the silicon nitride exists as needle shaped crystalline particles having a short axis, an average size along the short axis of 1 µm or less and an average aspect ratio of 2 to 10, the silicon carbide exists as crystalline particles whose average particle size is 1 µm or less, said silicon carbide component is dispersed in the silicon nitride crystalline particles or in grain boundaries thereof, and the excessive oxygen and the at least one element of Group IIIa in the Periodic Table exist in grain boundaries between the silicon nitride particles and the silicon carbide particles, and when the excessive oxygen is represented as SiO$_2$ and the at least one element of Group IIIa in the Periodic Table is represented as RE$_2$O$_3$, the molar ratio of SiO$_2$/RE$_2$O$_3$ is not more than 2 and wherein the total amount of Al, Mg and Ca contained in the sintered material as calculated as oxides thereof is 0.5% by weight or less.

6. A composite sintered material according to claim 5, wherein the excessive oxygen is in the form of SiO$_2$ and both the excessive oxygen and the elements of Group IIIa in the Periodic Table mainly exist in grain boundaries between silicon nitride crystalline particles and silicon carbide crystalline particles, and at least one crystalline phase selected from the group consisting of apatite, YAM and wollastonite precipitate in the grain boundaries.

7. A composite sintered material according to claim 5, wherein the molar ratio of SiO$_2$/RE$_2$O$_3$ is 0.8 to 1.1.

8. A silicon nitride-silicon carbide composite sintered material which comprises:

100 parts by weight of a silicon nitride component containing 90 to 99.5 mol % silicon nitride including excessive oxygen and 0.5 to 10 mol % of at least one element of Group IIIa in the Periodic Table calculated as oxides thereof, wherein the amount of excessive oxygen calculated as oxides of silicon present in the silicon nitride is not greater than 20 mol % of the silicon nitride; and 1 to 100 parts by weight of a silicon carbide component, wherein the silicon nitride exists as needle shaped crystalline particles having a short axis, an average size along the short axis of 1 μm or less and an average aspect ratio of 2 to 10, the silicon carbide exists as crystalline particles whose average particle size is 1 μm or less, said silicon carbide component is dispersed in the silicon nitride crystalline particles or in grain boundaries thereof, and the excessive oxygen and the at least one element of Group IIIa in the Periodic Table exist in grain boundaries between the silicon nitride particles and the silicon carbide particles, and when the excessive oxygen is represented as $SiO_2$ and the at least one element of Group IIIa in the Periodic Table is represented as $Re_2O_3$, the molar ratio of $SiO_2/RE_2O_3$ exceeds 2 and wherein the total amount of Al, Mg and Ca contained in the sintered material as calculated as oxides thereof is 0.5% by weight or less.

9. A composite sintered material according to claim 8, wherein the excessive oxygen is in the form of $SiO_2$ and major portions of both of the excessive oxygen and the at least one element of Group IIIa in the Periodic Table exist in grain boundaries between silicon nitride crystalline particles and silicon carbide crystalline particles, and at least one crystalline phase selected from the group consisting of silicon oxynitride and disilicate is precipitated in the grain boundaries.

10. A silicon nitride-silicon carbide composite sintered material according to claim 8 wherein the total amount of Al, Mg and Ca contained in the sintered material, calculated as oxides thereof, is less than 0.5% by weight.

* * * * *